United States Patent
Kravitz

(10) Patent No.: US 9,037,847 B2
(45) Date of Patent: May 19, 2015

(54) SYSTEM AND METHOD FOR ENFORCING DIGITAL RIGHTS MANAGEMENT RULES

(75) Inventor: David W. Kravitz, Fairfax, VA (US)

(73) Assignee: Google Technology Holdings LLC, Mountain View, CA (US)

( * ) Notice: Subject to any disclaimer, the term of this patent is extended or adjusted under 35 U.S.C. 154(b) by 1104 days.

(21) Appl. No.: 12/574,365

(22) Filed: Oct. 6, 2009

(65) Prior Publication Data

US 2011/0083189 A1 Apr. 7, 2011

(51) Int. Cl.
*H04L 29/06* (2006.01)
*G06F 21/10* (2013.01)

(52) U.S. Cl.
CPC ...................................... *G06F 21/10* (2013.01)

(58) Field of Classification Search
CPC .. H04L 9/3247; H04L 2463/101; G06F 21/00
See application file for complete search history.

(56) References Cited

U.S. PATENT DOCUMENTS

2006/0282391 A1* 12/2006 Peterka et al. .................. 705/57
2009/0044008 A1*  2/2009 Lim .............................. 713/156
2009/0165143 A1*  6/2009 Lee ............................... 726/26

OTHER PUBLICATIONS

Open Mobile Alliance, OMA DRM Specification, Jul. 23, 2008, Version 2.0.2.*

* cited by examiner

*Primary Examiner* — Izunna Okeke
(74) *Attorney, Agent, or Firm* — Amin, Turocy & Watson, LLP

(57) ABSTRACT

A method for enforcing digital rights management (DRM) rules in a first device is disclosed. In the method the first device receives a message that includes a rights object (RO) having a digital signature, directly from a source device. The first device determines an identity of a signing entity from the message including the RO having the digital signature. The signing entity is an entity that digitally signed the RO. The first device processes the message including the RO having the digital signature using the identity of the signing entity and an information state to enforce DRM rules in the first device.

17 Claims, 9 Drawing Sheets

SYSTEM AND METHOD FOR ENFORCING DIGITAL RIGHTS MANAGEMENT RULES

RELATED APPLICATION

The present application shares some common features with commonly assigned and copending U.S. patent application Ser. No. 12/477,104, entitled "System And Method For Securing The Life-Cycle Of User Domain Rights Objects", filed on Jun. 2, 2009, the disclosure of which is hereby incorporated by reference in its entirety.

BACKGROUND

Digital content has gained wide acceptance in the public. Such content includes, but is not limited to: movies, videos, music, and the like. Consequently, many consumers and businesses employ various digital media devices or systems that enable the reception of such digital multimedia content via several different communication channels (e.g., a wireless link, such as a satellite link, or a wired link, such as a cable connection). Similarly, the communication channel may also be a telephony based connection, such as DSL and the like. Regardless of the type of channel, the digital content and/or the distribution of the digital content is typically secured using a conditional access (CA) mechanism and a digital rights management (DRM) mechanism (e.g., encryption/decryption using keys).

Presently, specifications are being developed with respect to expanding the ways that content and services can be distributed over wireless communication networks. One such set of standards is being developed by the Open Mobile Alliance (OMA). In the OMA DRM system, for example, digital content (e.g., a movie or song) is associated with a rights object (RO). The RO provides granting rights to a Client Device for viewing or otherwise consuming the digital content. The entity in the Client Device that manages permissions and corresponding constraints relative to use of the digital content is commonly denoted as a DRM Agent. Nominally, a DRM Agent obtains an RO from a rights issuer (RI). DRM Agents conformant to the new OMA Secure Content Exchange (SCE) specifications (as well as to the legacy OMA DRM v2.x (i.e. OMA DRM v2.0 or OMA DRM v2.1) system) are intended to have the opportunity to participate in rights transfers with other such DRM Agents. In the legacy OMA DRM v2.x system, a domain is associated with and managed by a single RI, which implies that each DRM Agent needs to register with each RI for which it wants to make successful use of Domain ROs generated by that RI.

The conventional DRM rules regarding move RO transactions have several drawbacks. In particular, a special-purpose protocol is often implemented and runs that layer's security on top of an agent to agent (A2A) move RO transaction. In this case, the recipient device often cannot make a priori arrangements with the LRM, since consumption of ROs designated as requiring authorization require such authorization for each RO. Thus, this type of move RO transaction is no longer truly an A2A transaction. Additionally, although an outbound move (without local consumption) of the RO by a device that did not receive authorization from the LRM for that RO is allowed, once the device requests such authorization, the RO cannot be moved (or consumed) unless the device receives a corresponding authorization response from the LRM that indicates success. Further, the protocol is not equipped to handle a move of partial rights whereby the source device of the A2A move retains a partial state of an RO that could result in a subsequent move corresponding to the same RO. In addition, the protocol is inconsistent with moves of the RO via an RI without incurring substantial additional complexity within both the authorization protocol and the move via RI protocol to enable direct or indirect authenticated communications between LRMs and RIs. This would need to be done without sacrificing with the backwards compatible feature whereby an RI can deliver ROs to a legacy (i.e. OMA DRM v2.0/v2.1-only) device based on a prior successful move via RI request (that designates the intended recipient device) to that RI by an SCE-conformant source device.

Change request 429 to OMA DRM v2.0/v2.1 provided a procedure for a device that receives an RO within an RO acquisition protocol (ROAP) response directly from an RI to ascertain current revocation information concerning that particular RI in order to determine the fitness of that RI to provide ROs. This is done by means of online certificate status protocol (OCSP) messaging. In the change request, the only entities that generate ROs are RIs, which can be restricted to operating within a back-end service provider environment with its attendant physical security, personnel security, and audit controls. The introduction of the LRM into the SCE enabler implies that this nominally home-based entity needs to be truly revocable in a way that goes beyond just an initial device (that receives the RO directly from the LRM) making use of revocation information. This is true because besides the addition of this home-based entity type there is also the addition of further procedures to reuse ROs across multiple Devices.

In OMA DRM v2.0/v2.1, the only specified reuse of ROs across multiple devices pertains to domains of devices. A trust authority should allow the use of such domains only if the necessary contractual arrangements are in place, since RIs self-manage their domains. An LRM self-manages OMA DRM v2.x domains and/or directly generates OMA DRM v2.x domain ROs and/or Device ROs that are usable by compliant v2.x Devices only if it has been entrusted with a private key corresponding to a certificate with a rightsIssuer key purpose that makes it appear indistinguishable from an RI to v2.x Devices. All OMA SCE-conformant Devices (unlike OMA DRM v2.0/v2.1-only Devices) are required to support DRM time, which is advantageous in determining the current validity of certificate revocation lists (CRLs) and/or OCSP responses. Thus, these digitally signed objects can be "virally" spread and independently verified without relying on trust in the immediate source or the use of nonces to determine freshness. The "viral" aspect is important in that there is not a reliance on every device being compliant and thus providing the latest revocation information it has to other devices.

SUMMARY

Disclosed herein is a method for enforcing digital rights management (DRM) rules in a first device, according to an embodiment. In the method, the first device receives a message including a rights object (RO) having a digital signature, at the first device directly from a source device. The first device determines an identity of a signing entity from the message including the RO having the digital signature. The signing entity is an entity that digitally signed the RO. The first device processes the message including the RO having the digital signature using the identity of the signing entity and an information state to enforce DRM rules in the first device. The information state provides independently acquired information about the signing entity, or indication of absence of independently acquired information about the signing entity.

Also disclosed herein is a method of moving an RO from a first device to another device, according to an embodiment. The other device is a primary device. In the method, the first device sends a move request to a rights issuer (RI). The RI receives the move request from the first device. The RI then determines whether the first device is a primary device. If the first device is a primary device, the RI prepares a move response message to the first device indicating success of the move request and sends the move response message to the first device. The RI generates a new RO based on a prior RO and signs the new RO. The RI then sends the new RO having a new signature to the other device. If the first device is not a primary device, the RI prepares a move response message indicating denial of the move request and sends the move response message to the first device.

Also disclosed herein is a first device for enforcing DRM rules using an RO having a signature, according to an embodiment. The first device includes an input/output module configured to receive a message including an RO having a digital signature from a source device. The first device also includes a signature determination module configured to determine an identity of a signing entity from the message including the RO having the digital signature. The signing entity is an entity that digitally signed the RO. The first device also has an RO processing module configured to process the message including the RO having the digital signature using the identity of the signing entity and an information state. The information state provides independently acquired information about the signing entity, or indication of absence of independently acquired information about the signing entity.

Still further disclosed is a computer readable storage medium on which is embedded one or more computer programs implementing the above-disclosed method for enforcing digital rights management (DRM) rules in a first device, according to an embodiment.

Embodiments of the present invention may be applied to cap vendor liability associated with manufacture of LRMs. Embodiments of the invention enable system recovery against instances of abuse of what was intended when specifying differentiation of key purposes relevant to the original issuer of ROs that are transferred via A2A transactions. For instance, if the RO is ever lent by a DRM requester to a rogue DRM Agent, the rogue DRM Agent may "lend" the RO concurrently to an arbitrary number of devices (i.e., without waiting for release), each of which has seemingly legitimate use of the RO for a period of time specified by the rogue DRM agent. Embodiments of the invention enable effective recall of the RO with regard to further transfers, which would not otherwise be the case even if the LRM has been revoked and any known-compromised devices that have handled the RO have been revoked.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
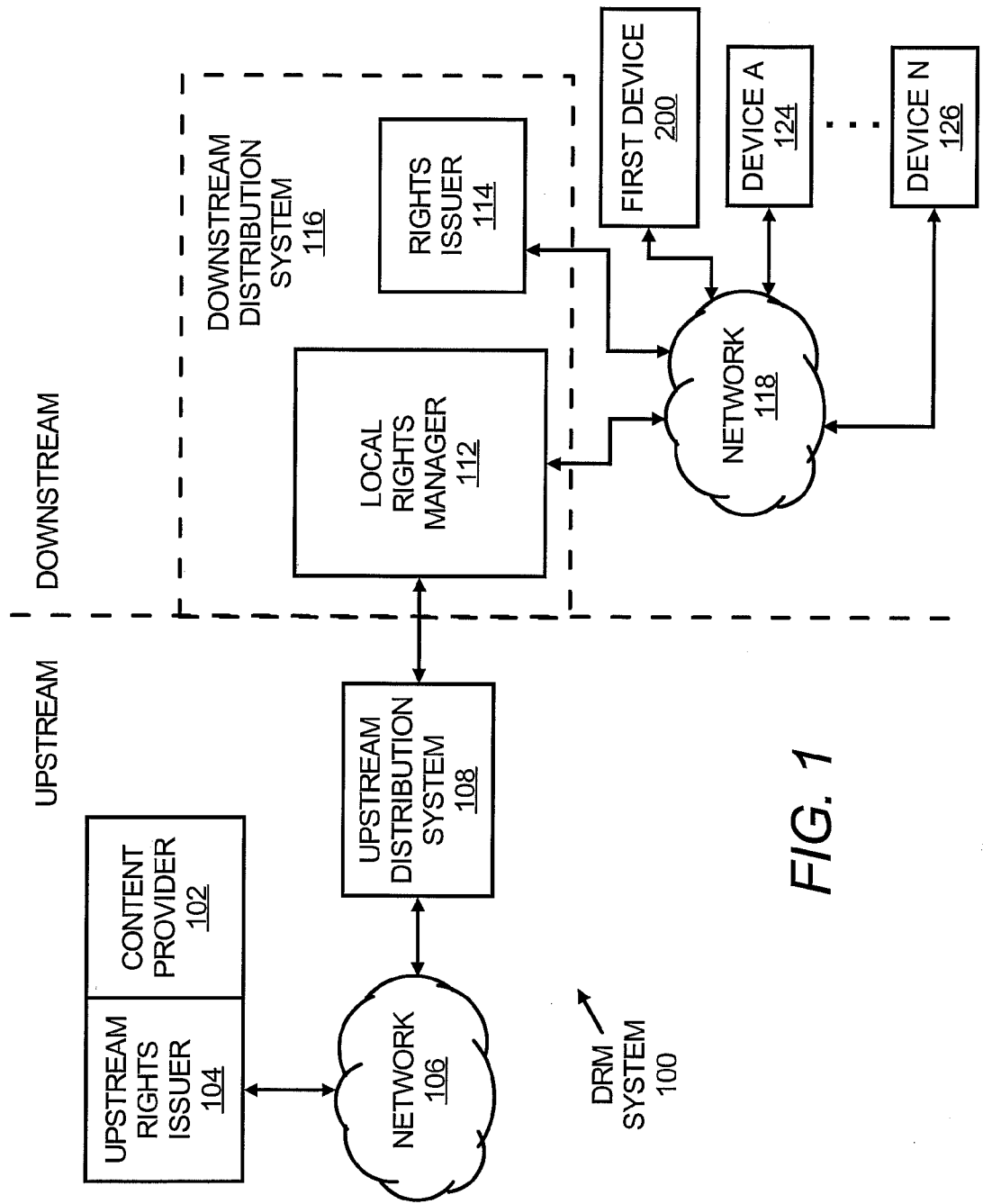
FIG. 1 illustrates a simplified block diagram of a DRM system, according to an embodiment of the invention.

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

As used herein, the "rights issuer" or "RI" entity is characterized by certificate with rightsIssuer key purpose, without localRightsManagerDevice key purpose, and without localRightsManagerDomain Key purpose. This entity type is typically a service provider.

The "local rights manager" or "LRM" is characterized by certificate with localRightsManagerDevice key purpose and/or localRightsManagerDomain Key purpose; such certificate may additionally include rightsIssuer key purpose. This entity type is typically a home-network entity (within an STB or mobile device that has access to upstream non-OMA DRM content and to rights that may be imported into OMA DRM (enabling DRM interoperability)). By way of example, the LRM (or associated software and/or hardware) is configured to convert signals to remove upstream non-OMA DRM protection on content, and in certain instances, to also transcode the content so that the resultant content matches the characteristics and/or limitations of the destination device. The LRM is configured to generate Rights Objects to enable cryptographic access to and controlled use of the OMA-DRM-protected content. By way of example, the LRM (or associated software and/or hardware) is configured to package the (possibly transcoded) content in OMA-DRM protected content form so that the resulting DRM Content Format (DCF), or Packetized DRM Content Format (PDGF) (for Continuous Media), can be made available to DRM Agents.

The "v2.x Device" entity is characterized by certificate with drmAgent key purpose, and without sceDrmAgent key purpose. The v2.x Device entity may comprise, for instance, a v2.0 or v2.1 device without SCE.

The "SCE Device" is characterized by certificate with drmAgent key purpose and sceDrmAgent key purpose. The SCE Device may include, for instance, a v2.1 DRM Agent. An SCE Device is distinguishable from a v2.x Device by an SCE-conformant RI and by another SCE Device (based on inclusion of sceDrmAgent key purpose). The SCE Device certificate must include drmAgent key purpose in order to be recognized by a v2.x RI. In OMA DRM v2.x, Devices do not communicate with each other using a cryptographic protocol and thus do not verify each other's certificate.

The "Device Rights Object" is initially targeted by an RI or LRM to a single specific Device. If the Device Rights Object is initially intended for a v2.x Device, the LRM's certificate must include a rightsIssuer key purpose. If the device rights object is initially intended for an SCE Device, the LRM's certificate must include a localRightsManagerDevice key purpose.

Referring first to FIG. 1, there is shown a block diagram of a digital rights management (DRM) system 100, according to an embodiment of the invention. It should be understood that the following description of the DRM system 100 is but one manner of a variety of different manners in which such a DRM system 100 may be configured and operated. In addition, it should be understood that the DRM system 100 may include additional components and that some of the components described may be removed and/or modified without departing from a scope of the DRM system 100.

As shown in FIG. 1, the DRM system 100 includes a content source or provider 102, an upstream digital rights issuer (RI) 104 associated with the content provider 102, a network 106 coupled to the content provider 102 and/or the upstream RI 104, and an upstream distribution system 108 coupled to the network 106. The content provider 102, the upstream RI 104, the network 106 and the upstream distribution system 108 are part of an upstream system or an upstream DRM system, which, in general, is the DRM system or portion of the DRM system in which the content originates or from which the content is distributed.

The system 100 also includes a Local Rights Manager (LRM) 112, which may be part of a downstream distribution system, shown generally as 116, which is coupled to the upstream distribution system 108. The LRM 112 is generally configured to translate upstream licenses and protected content and issues licenses and other digital rights to one or more of the end user communication devices in the downstream system. Translation is the process that takes upstream licenses and protected content and makes that information available in the downstream DRM system. Thus, at least functionally, the LRM 112 also may be considered to be part of the upstream distribution system 108, or at least straddling the upstream and downstream systems.

The DRM system 100 also includes a network 118 that couples the downstream distribution system 116 to one or more end user communication devices 122, 124 and 126 and the first device 200. The end user communication devices may be primary devices, for instance SCE devices, or secondary devices, for instance v2.x devices. The first device 200 is described in detail hereinbelow with respect to FIG. 2. The downstream distribution system 116, the network 118, the end user communication devices 124, 126 and the first device 200 are part of a downstream system or downstream DRM system. In general, the downstream DRM system is the DRM system or portion of the DRM system to which the protected content is transmitted or distributed.

Also shown in FIG. 1 is a downstream RI 114, which may be provided in the downstream distribution system 116, for instance, when the downstream distribution system 116 does not have an LRM, or may be provided in addition to and independently of an LRM 112. In addition, the downstream RI 112 may be associated with a downstream content provider (not shown) that differs from the upstream content provider 102.

The LRM 112/downstream RI 114 is provisioned with an identity certificate, which includes a public key corresponding to a private key that is provisioned to the LRM 112/downstream RI 114, and an attribute certificate/authorization certificate, which identifies the LRM/downstream RI 112. Attribute certificates/authorization certificates may be used for processing of "user domain rights objects."

It will be apparent that the system 100 may include additional elements not shown and that some of the elements described herein may be removed, substituted and/or modified without departing from the scope of the system 100. It should also be apparent that one or more of the elements described in the embodiment of FIG. 1 may be optional.

Figure 2:
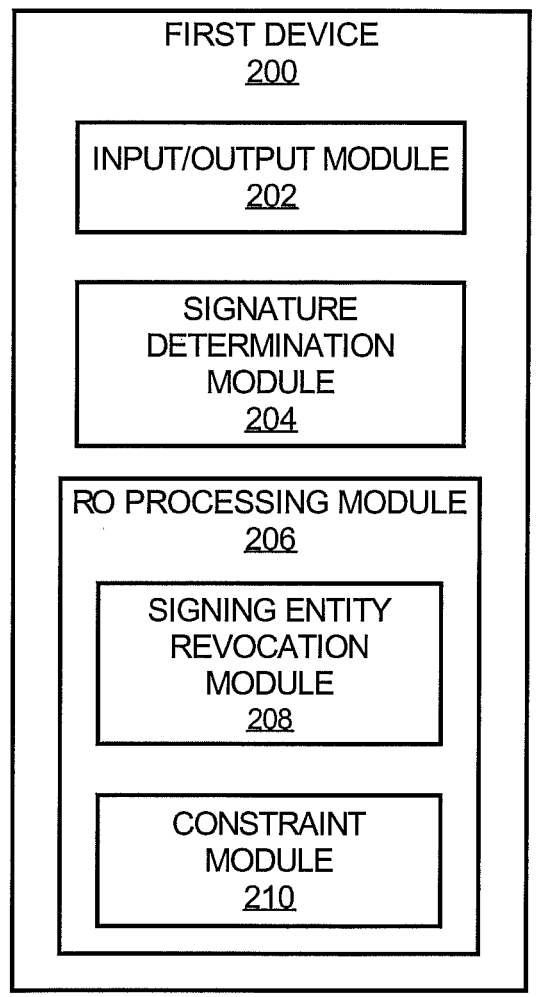
FIG. 2 illustrates a first device, according to an embodiment of the invention.

FIG. 2 illustrates a block diagram of a first device 200, according to an embodiment of the invention. The first device 200 is an SCE Device configured to perform the method 300 as described with respect to FIG. 3 below. It should be understood that the following description of the first device 200 is but one manner of a variety of different manners in which such a first device 200 may be configured and operated. In addition, it should be understood that the first device 200 may include additional components and that some of the components described may be removed and/or modified without departing from a scope of the first device 200.

As shown in FIG. 2, the first device 200 includes an input/output module 202, a signature determination module 204, and a rights object (RO) processing module 206. The RO processing module 206 includes a signing entity revocation module 208, and a constraint module 210.

The modules 202-206 are configured to perform the methods 300, 310, 320, 350, 370, 380, 400, and 430 described with respect to FIGS. 3A-3F, 4A, and 4B below. The modules 202-206 may comprise software modules, hardware modules, and a combination of software and hardware modules. Thus, in one embodiment, one or more of the modules 202-206 comprise circuit components. In another embodiment, one or more of the modules 202-206 comprise software code stored on a computer readable storage medium, which are executable by a processor.

Examples of methods in which the system 100 may be employed for enforcing DRM rules in the first device 200 will now be described with respect to the following flow diagrams of the methods 300, 310, 320, 350, 370, 380, 400, and 430 respectively depicted in FIGS. 3A-3F, 4A, and 4B. It should be apparent to those of ordinary skill in the art that the methods 300, 310, 320, 350, 370, 380, 400, and 430 represent generalized illustrations and that other steps may be added or existing steps may be removed, modified or rearranged without departing from the scopes of the methods 300, 310, 320, 350, 370, 380, 400, and 430. In addition, the methods 300, 310, 320, 350, 370, 380, 400, and 430 are described with respect to the system 100 by way of example and not limitation, and the methods 300, 310, 320, 350, 370, 380, 400, and 430 may be used in other systems.

Figure 4A:
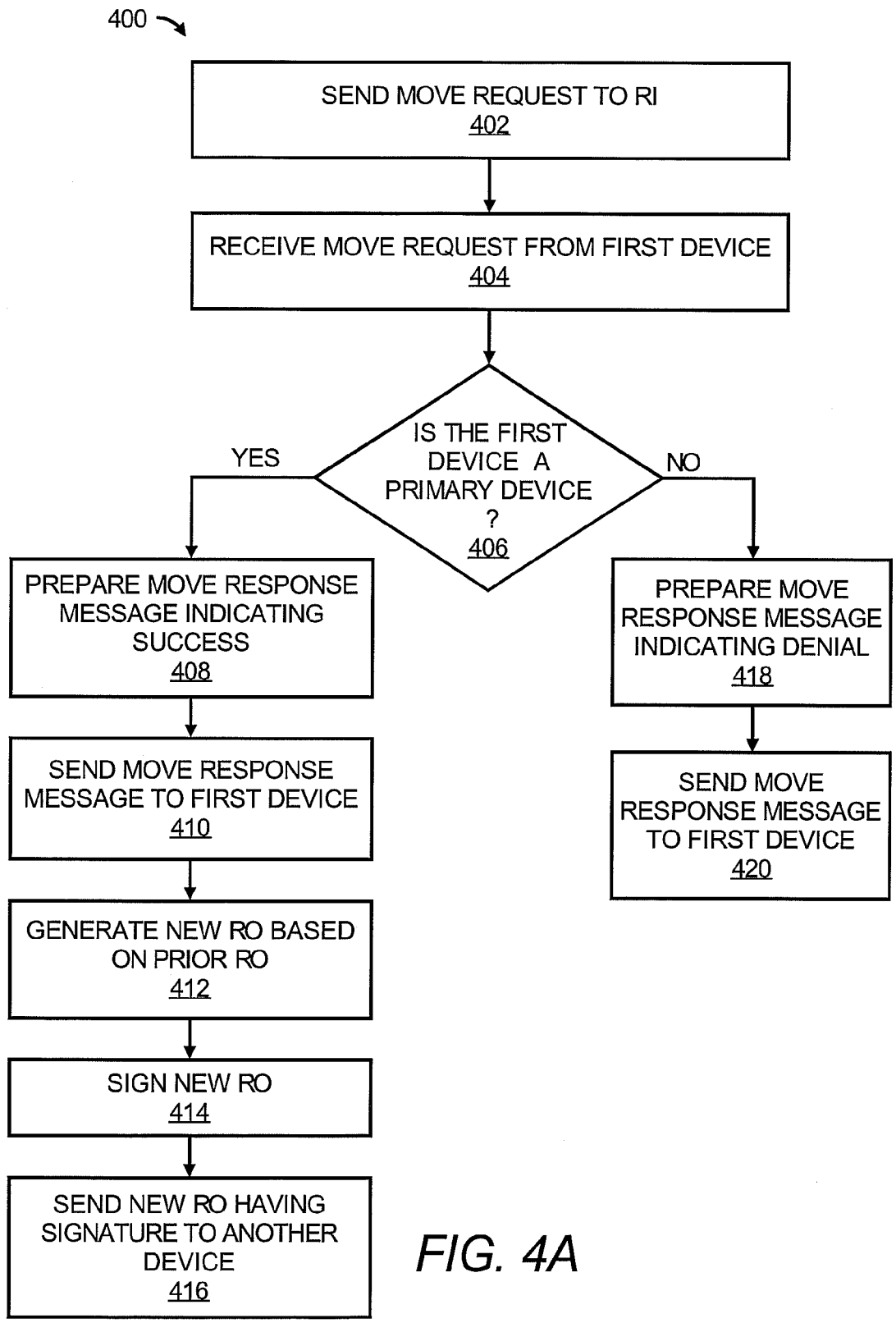
FIG. 4A illustrates a flow diagram of a method for enforcing DRM rules, according to an embodiment of the invention.
Figure 4B:
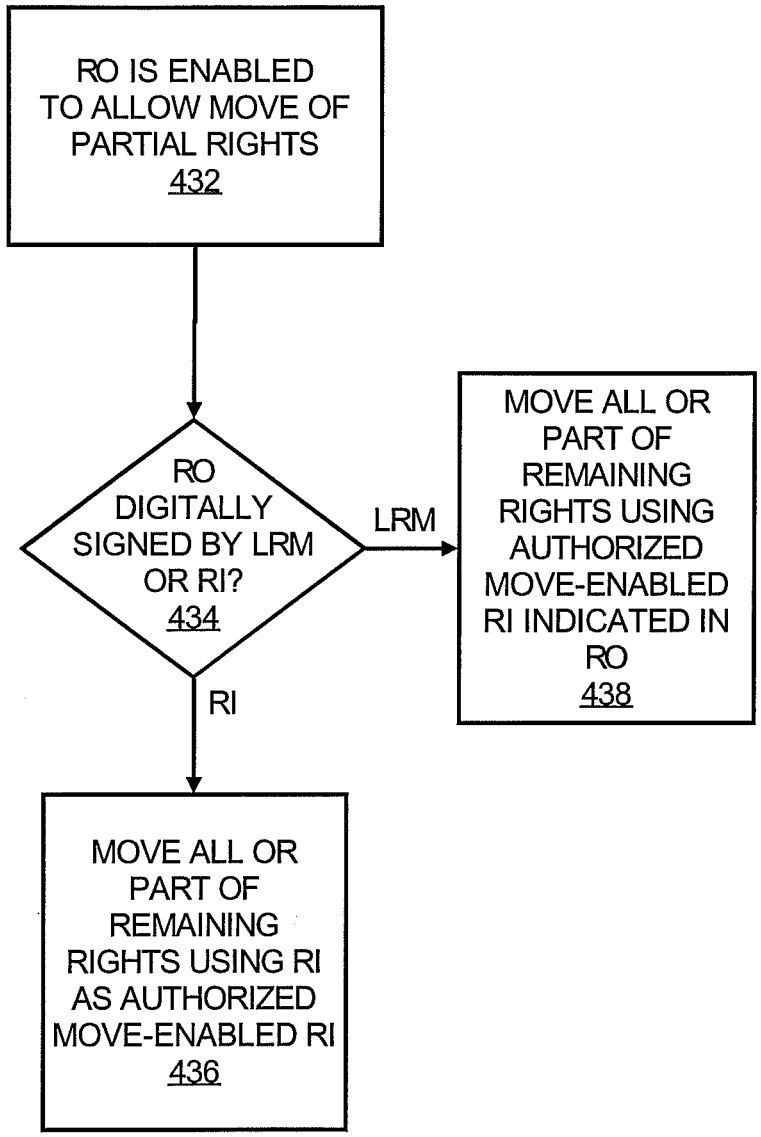
FIG. 4B illustrates a flow diagram of a method for enforcing DRM rules, according to an embodiment of the invention.

The first device 200 is configured as a primary device, for instance an SCE device. The methods 300, 310, 320, 350, 370, 380, 400, and 430 concern the movement of ROs to and from the first device 200 directly through A2A transactions and indirectly through RIs. The ROs are generated by either a service provider RI or an LRM and provide access to content. The first device 200 is configured to process device ROs as discussed with respect to the methods 300, 310, 320, 350, 370, and 380. The first device 200 may be configured to process user domain ROs in addition to processing device ROs as discussed with respect to the methods 300, 310, and 370. Further, as shown in FIGS. 4A and 4B, the first device 200 may be configured to process user domain ROs in addition to processing device ROs.

Some or all of the operations set forth in the methods 300, 310, 320, 350, 370, 380, 400, and 430 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

FIGS. 3A-3F illustrate methods 300, 310, 320, 350, 370, and 380 of enforcing DRM rules in a first device 200 and apply to device ROs using A2A move transactions.

The method 310 pertains to determining a revocation status of an RI or LRM when receiving an RO through an A2A move RO transaction or A2A move RO operation, A2A lend RO operation, or A2A share RO operation. In contrast, moves via a move-enabled RI already account for a check by the recipient device on the revocation status of the RI and requires that the recipient device be registered with the RI. The move via RI protocol is comprised of generation and transmission of a move via RI request message by a device, for instance a primary device or a secondary device, and processing of the move via RI request message and generation and transmission of a move via RI response message by the RI. If the move via RI response message indicates success then the RI follows up by generating a new RO for delivery to another device. The generation and delivery of the new RO is not part of the move via RI protocol, as presented in the actual OMA DRM SCE Technical Specifications. The RI may trigger the device to send an RO acquisition protocol request message to the RI or the RI might deliver the RO in an RO acquisition protocol response message using a 1-pass method that does not require a preceding pass comprised of an RO acquisition protocol request message by the device. Further, while the move via RI protocol involves a primary device as the requesting device if the response is to indicate success, the recipient device relative to the ensuing RO acquisition protocol need not be a primary device to receive a device RO. The recipient device does need to be a primary device, however, to receive a user domain RO that results from a move via RI.

Additionally, the method 320 pertains to a registration constraint on the first device 200. Device ROs are issued originally to an individual device, for instance the first device 200 or the end devices 122-126, and in the SCE standard can go from one device to another directly through the devices by A2A move transactions or through an RI intermediary. Checking for and processing a registration constraint (against local record of registration) as described in the method 320 is relevant to the situation where the recipient device received the device RO through an A2A move transaction, according to the OMA DRM SCE technical specifications.

If an RI generates the original device RO then, according to the OMA DRM SCE technical specifications, if the RO is to be moved through an RI, rather than directly through an A2A move transaction, the RO is moved through the same RI that created the original RO. If an LRM created the original RO then the LRM is not involved in moving the RO thereafter. The LRM includes a move indication element in the original RO, with a list of move-enabled RIs by which the RO may be moved. If a move-enabled RI identified in the move indication element of the RO moves the RO then once a particular move-enabled RI is chosen, then the RO is restricted to move either through an A2A move transaction or through that particular move-enabled RI. This is determined by the fact that an RI that moves a device RO does not include a move indication element in the new RO that it generates. This applies whether the new RO is based on an RO previously generated by the RI or by an LRM that indicated the RI's identity in a move indication element within the RO. An RI also does not include a move indication element in a device RO for which it is the original issuer. However, where an LRM-signed RO allows move of partial rights with such multiple moves resulting in parts of the rights in the RO going from the same source device to more than one recipient device or to the same recipient device at separate times, parts of the rights in the same RO may be moved at different times through different RIs listed in the move indication element.

For instance, one device may send three plays of content out of six remaining plays of content, corresponding to an LRM-signed RO that a device received from the LRM or from a device in an A2A move, to another device using an RI listed in the move indication element. The same device may then locally use or move using A2A, for instance, 1 of the remaining three plays it has retained, and then subsequently move the remaining 2 plays to either the same or a different device than it had moved to previously using an RI, and can do so using the same RI used previously or a different RI listed in the same move indication element. Move of user domain ROs can also be done using an RI, but in that instance, the move indication element remains static throughout the lifecycle of the RO, the move indication element is inserted within the original RO whether the signing entity is an RI or LRM, and moves can be performed using any RI in the move indication element.

Figure 3A:
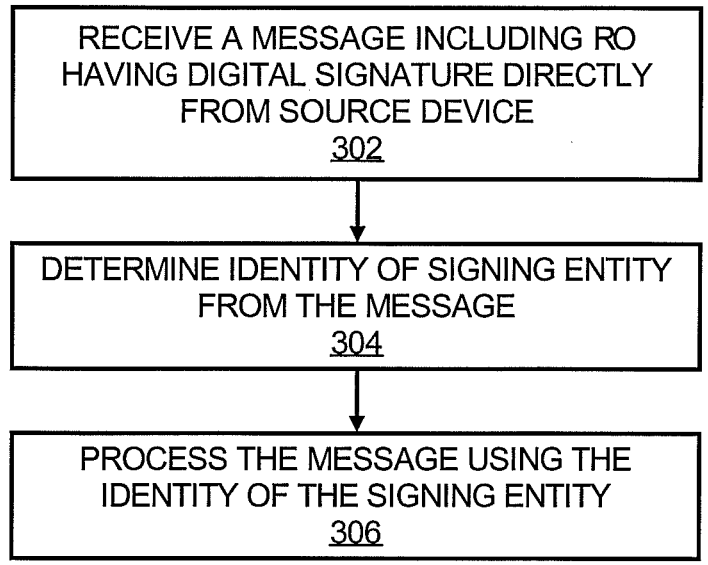
FIG. 3A illustrates a flow diagram of a method for enforcing DRM rules, according to an embodiment of the invention.

With particular reference to FIG. 3A, at step 302, the input/output module 202 of the first device 200 receives a message including an RO having a digital signature directly from a source device. The source device is a primary device, for instance an SCE device.

At step 304, the signature determination module 204 of the first device 200 determines an identity of a signing entity from the message including the RO having the digital signature, in which the signing entity is an entity that digitally signed the RO.

At step 306, the RO processing module 206 processes the message including the RO having the digital signature using the identity of the signing entity and an information state to enforce DRM rules in the first device 200. The DRM rules determine the disposition of the RO. The disposition of the RO may be a determination of rejection or acceptance, or a determination that the device needs to acquire a current registration in order to initiate consumption because the RO is constrained to require such currently valid registration and the device's information state does not include the current registration. The information state provides one of independently acquired information about the signing entity, and indication of absence of independently acquired information about the signing entity. The disposition of the RO may be determined by the methods 310 and 320 as described with respect to FIGS. 3B and 3C hereinbelow.

Figure 3B:
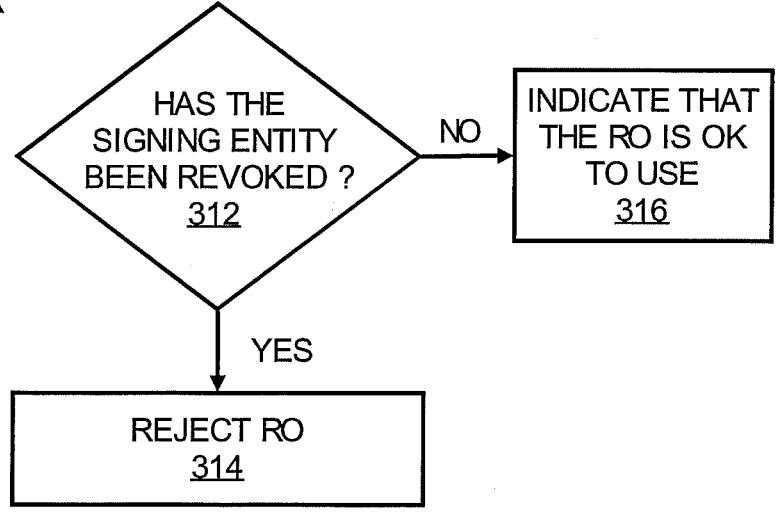
FIG. 3B illustrates a flow diagram of a method for enforcing DRM rules, according to an embodiment of the invention.

Turning now to FIG. 3B, the method 310 provides a more detailed discussion of step 306 in the method 300 in FIG. 3A. At step 312, the first device 200 processes the message by using the information state to determine whether there is evidence that the signing entity has been revoked. The first device 200 may determine that there is evidence that the signing entity has been revoked by determining whether the signing entity is part of an acquired certificate revocation list (CRL). In addition or alternately, the first device 200 may determine that the signing entity is a revoked entity determined by an acquired online certificate status protocol (OCSP) response.

Checking the revocation status of the signing entity (against local revocation status information) is relevant to A2A communications beyond just move. For instance, the revocation status of the signing entity is relevant to copy RO, share RO and lend RO transactions. Even if there is a registration constraint that is not met (i.e., the device is not currently registered with the signing entity), then a subsequent A2A move from that device to another is still permitted. In order to perform a move via a move-enabled RI, a source device needs to be registered with that RI. The move-enabled RI may be different from the signing entity if the signing entity of the original RO was an LRM and the RO that the first device 200 received had not been previously moved via an RI.

At step 314, in response to a determination there is evidence that the signing entity has been revoked, the first device 200 rejects the RO. However, if the signing entity is determined to not have been revoked, the first device 200 may indicate that the RO is acceptable to use, as indicated at step 316.

Figure 3C:
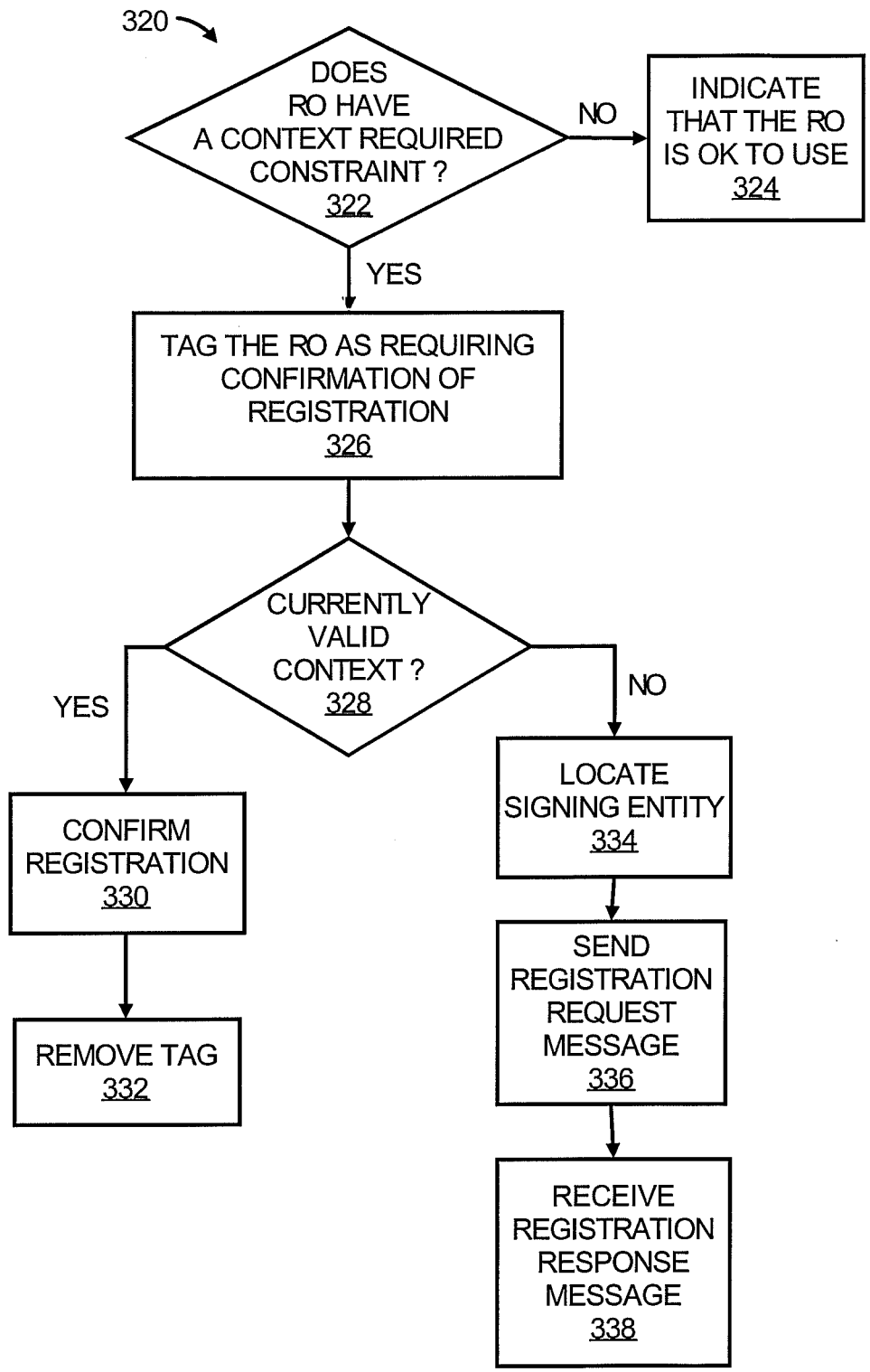
FIG. 3C illustrates a flow diagram of a method for enforcing DRM rules, according to an embodiment of the invention.

Turning now to FIG. 3C, the method 320 concerns a constraint related to registration which is denoted as a <contextRequired> constraint in the OMA DRM SCE specifications (hereinafter a context required constraint) and is relevant to device ROs and provides a more detailed discussion of step 306 in the method 300 in FIG. 3A. At step 322, the first device 200 processes the message by determining whether the RO has a context required constraint. The RO having the constraint requires a registration with the signing entity to provide access to DRM content.

At step 324, in response to the RO not having the context required constraint, the first device 200 may indicate that the RO is acceptable for use. At step 326, in response to the RO having the context required constraint, the first device 200 tags the RO at the primary device as requiring confirmation of the registration. According to the OMA DRM technical specification, the context required constraint is only checked if the direct communication between the source device and the first device was an A2A move (i.e., not another A2A operation like Ad-hoc share or lend).

At step 328, the first device 200 ascertains the registration status of the first device 200 by using the information state to determine whether the first device 200 has a currently valid context with the signing entity. The information state may provide independently acquired information about the signing entity, or indication of the absence of independently acquired information about the signing entity.

At step 330, in response to the first device 200 having the currently valid context with the signing entity, the first device 200 confirms the registration of the first device 200. In addition, at step 332, the first device 200 removes the tag from the RO. The RO thereafter is operable to provide access to DRM content at the first device 200.

However, at step 334, in response to the first device 200 not having the currently valid context with the signing entity, the first device 200 locates the signing entity using a Universal Resource Locator (URL). The URL for the signing entity is included in the RO.

At step 336, the first device 200 sends a registration request message to the signing entity. The signing entity determines a registration response message as described hereinbelow with regard to the method 350 and FIG. 3D. At step 338, the first device 200 receives the registration response message from the signing entity. The registration response message may indicate a registration of the primary device if the signing entity registers the first device 200. If the signing entity denies registration of the first device 200 the registration response message indicates a denial of registration of the first device 200.

Figure 3D:
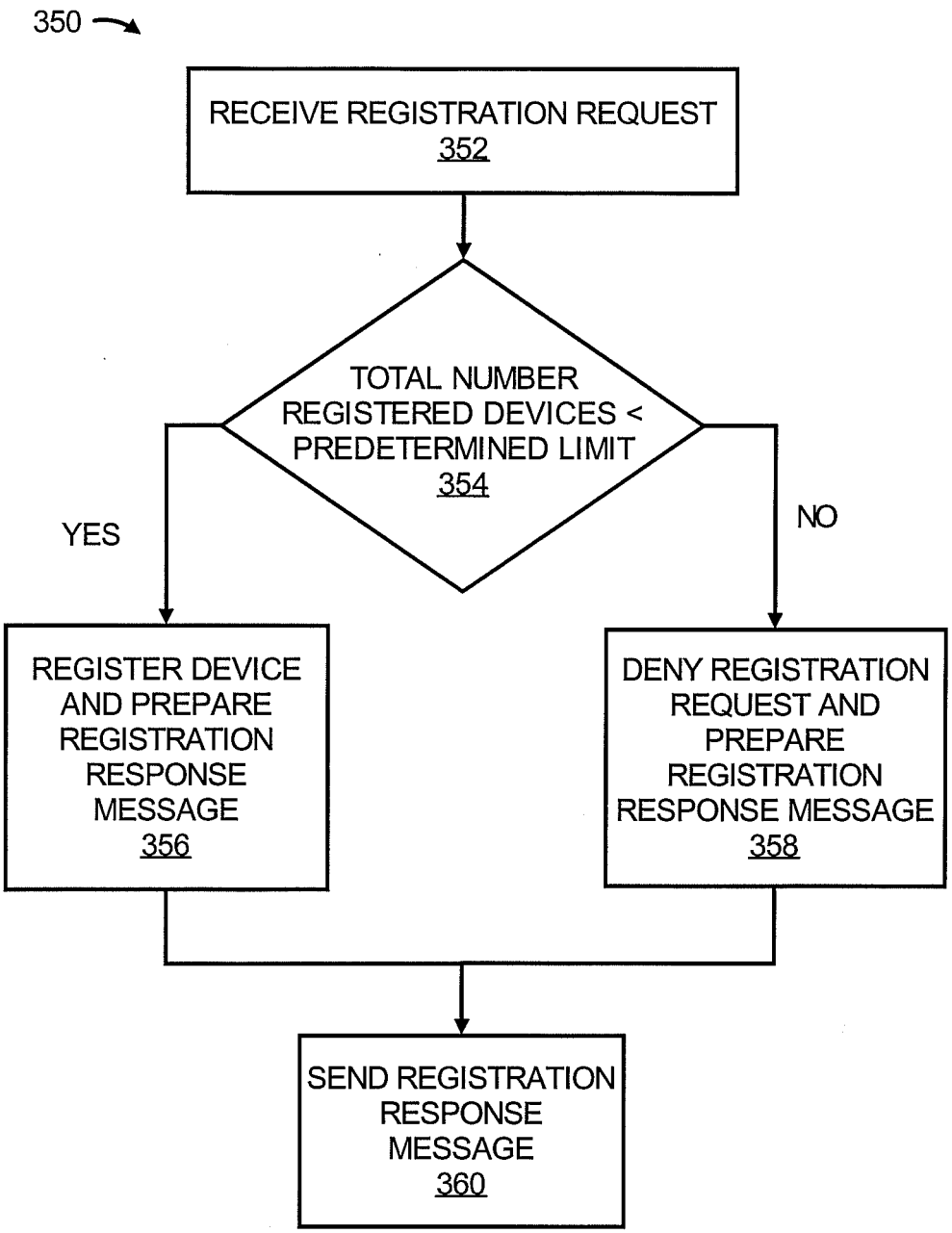
FIG. 3D illustrates a flow diagram of a method for enforcing DRM rules, according to an embodiment of the invention.

With reference now to FIG. 3D, the method 350 pertains to steps performed at the signing entity upon receipt of the registration request message at step 336 in the method 320 in FIG. 3C, according to an embodiment. At step 352, the signing entity receives the registration request message. In addition, at step 354, the signing entity determines whether a total number of counted registered devices is less than a predetermined limit. The total number of counted registered devices may be total number of concurrently registered primary devices. Alternately, the total number of counted registered devices may be a total number of concurrently registered primary and secondary devices. It is possible that upon receipt of the registration request message there may already be a total number of counted registered devices that strictly exceeds the predetermined limit. This could happen if at some previous point the signing entity lowered the value of the predetermined limit without automatically terminating any of the (unexpired) active registrations.

At step 356, in response to the total number of counted registered devices being less than the predetermined limit, the signing entity registers the first device 200 and prepares a registration response message to indicate that the first device 200 is registered. However, in response to the total number of counted registered devices being equal to or greater than the predetermined limit, the signing entity denies the registration request and prepares a registration response message to indicate that the registration request has been denied, as indicated at step 358.

At step 360, the signing entity sends the registration response prepared at either steps 356 and 358 to the first device 200.

Figure 3E:
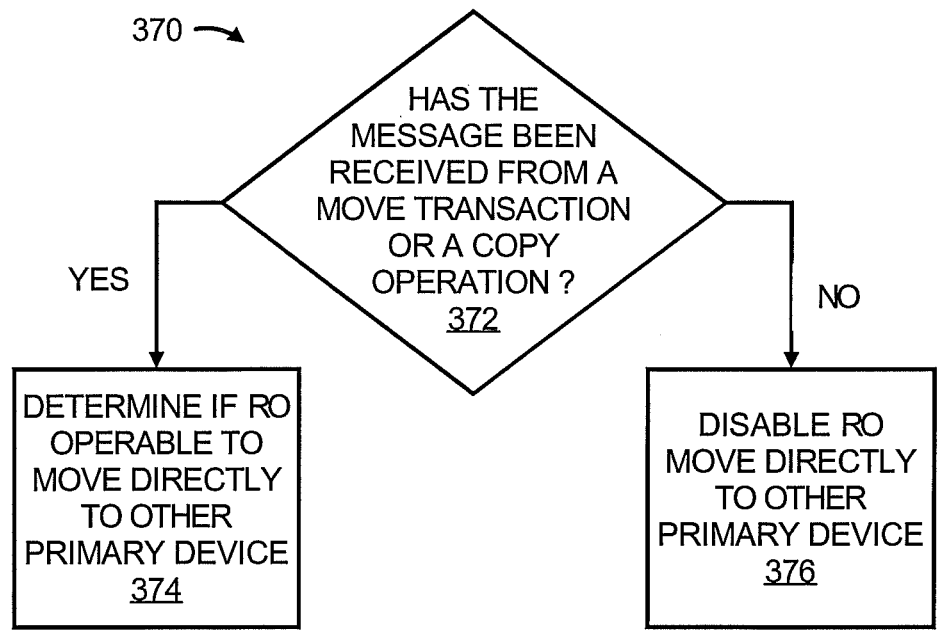
FIG. 3E illustrates a flow diagram of a method for enforcing DRM rules, according to an embodiment of the invention.

Turning now to FIG. 3E, the method 370 pertains to a method of ensuring that the RO received at the first device 200 is not enabled for further moves if the first device 200 received the RO directly from the source device under an A2A ad-hoc share operation or A2A lend operation rather than under an A2A move transaction or an A2A copy operation, according to an embodiment. As discussed herein, the first device 200 is disabled from acting as a source device for the RO received under a transaction or operation other than a move transaction or a copy operation.

At step 372, a determination as to whether the message received at step 302 in FIG. 3A has been received from a move transaction or a copy operation is made. At step 374, if the message was received from a move transaction or a copy operation, the first device 200 determines whether the RO is operable to be moved directly to another primary device. Alternatively, at step 376, if the message was not received in a move transaction or a copy operation, the first device 200 disables the RO from moving directly to another primary device. For instance, under OMA SCE A2A technical specifications, in the case of and RO received through a lend RO operation, permissions that are present in the RO other than <play>, <display> and <execute> must not be granted, and in the case of an RO received through a share RO operation, only permissions under the <ad-hoc share> permission can be granted.

Figure 3F:
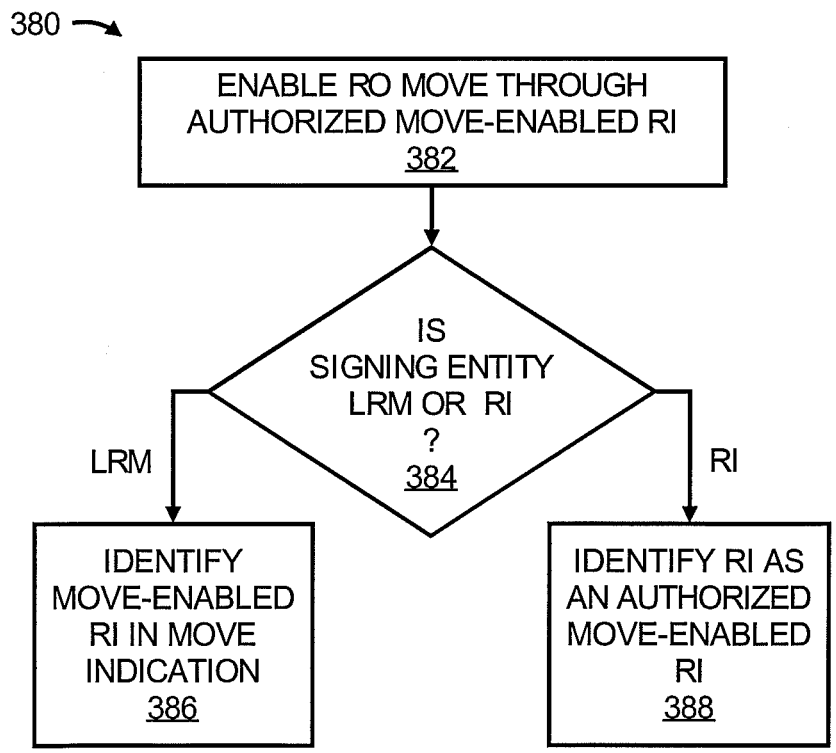
FIG. 3F illustrates a flow diagram of a method for enforcing DRM rules, according to an embodiment of the invention.

Turning now to FIG. 3F, the method 380 pertains to identifying at least one authorized move-enabled RI through which the RO may be subsequently moved, according to an embodiment. At step 382, the first device 200 enables the RO to be moved through an authorized move-enabled RI to another device, wherein the another device is one of a primary device and a secondary device.

At step 384, the first device 200 determines whether the signing entity is one of an LRM and an RI. In response to the signing entity being an LRM, the first device 200 identifies at least one move-enabled RI within a move indication element in the RO as an authorized move-enabled RI, as indicated at step 386. Alternatively, in response to the signing entity being the RI, the first device 200 identifies the RI as an authorized move-enabled RI, as indicated at step 388.

With reference now to FIG. 4A, the method 400 applies to device ROs. The method 400 applies to user domain ROs in the instance where the another device is required to be a primary device, and a constraint requiring registration is not included in the new RO. Generally speaking, the method 400 addresses move via an RI. It allows the first device 200 to determine whether the RI has been revoked if a move via RI is attempted. For instance, the RI may have been revoked by an entity at a higher level in the DRM system than the RI.

At step 402, the first device 200 sends a move request message to an RI. The move request message includes a move request. The first device 200 may move an entire RO or alternately partial rights as described hereinbelow with regard to FIG. 4B and the method 430.

At step 404, the move-enabled RI receives the move request message from the first device 200. In addition, at step 406, the RI determines whether the first device 200 is a primary device.

In response to the first device 200 being a primary device, the RI prepares a move response message indicating success of the move request at step 408. Thereafter, the RI sends the move response message to the first device at step 410.

The RI generates a new RO based on a prior RO as indicated at step 412. The new RO is enabled to be moved directly from one primary device to another primary device. The RI also constrains the new RO, e.g., using a context required constraint, so that a recipient primary device of a direct move is required to perform or to have previously performed registration with the signing entity as a condition of the new RO being operable to provide access to DRM content.

At step 414, the RI signs the new RO.

At step 416, the move-enabled RI sends the new RO having a signature to the another device, which is required to be a primary device if the new RO has a context required constraint. A secondary device is not equipped to perform a direct move (as either source or recipient), and also would ultimately reject the RO from the move-enabled RI if there was a top-level constraint that the secondary device could not process, such as the context required constraint. The RI may determine from the intended recipient device's certificate whether it is a primary device or not, and generate the new RO accordingly.

However, at step 406, in response to the first device 200 not being a primary device, the RI prepares a move response message indicating denial of the move request, as indicated at step 418. At step 420, the RI sends the move response message to the first device 200.

Turning now to FIG. 4B, the method 430 occurs at the first device 200. The method 430 describes a protocol for the first device 200 to move partial rights corresponding to a device RO. The corresponding protocol for the first device 200 to move partial rights corresponding to a user domain RO is not shown herein, and is discussed in U.S. patent application Ser. No. 12/477,104.

At step 432, the first device 200 determines that the RO is enabled to allow move of partial rights. If the RO has been enabled to allow move of partial rights then the first device 200 may move one of all or part of remaining rights in the RO. If the RO has not been enabled to allow move of partial rights then the first device 200 may move all of remaining rights in the RO, but not a (non-entire) part of remaining rights in the RO. If the RO has not been enabled to allow move of partial rights, remaining rights in the RO may still be only part of rights that the first device had received because the first device may previously have locally used part of the rights. At step 434, the first device 200 then determines whether the RO was digitally signed by an LRM or an RI. The first device 200 may thereafter move one of all or part of remaining rights in the RO using an authorized move-enabled RI. If the RO was digitally signed by an RI, the authorized move-enabled RI is the RI that signed the RO, as indicated at step 436. If the RO was digitally signed by an LRM, the authorized move-enabled RI is one of at least one move-enabled RIs identified within the RO, for instance, in a move indication element in the RO, as indicated at step 438.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

Figure 5:
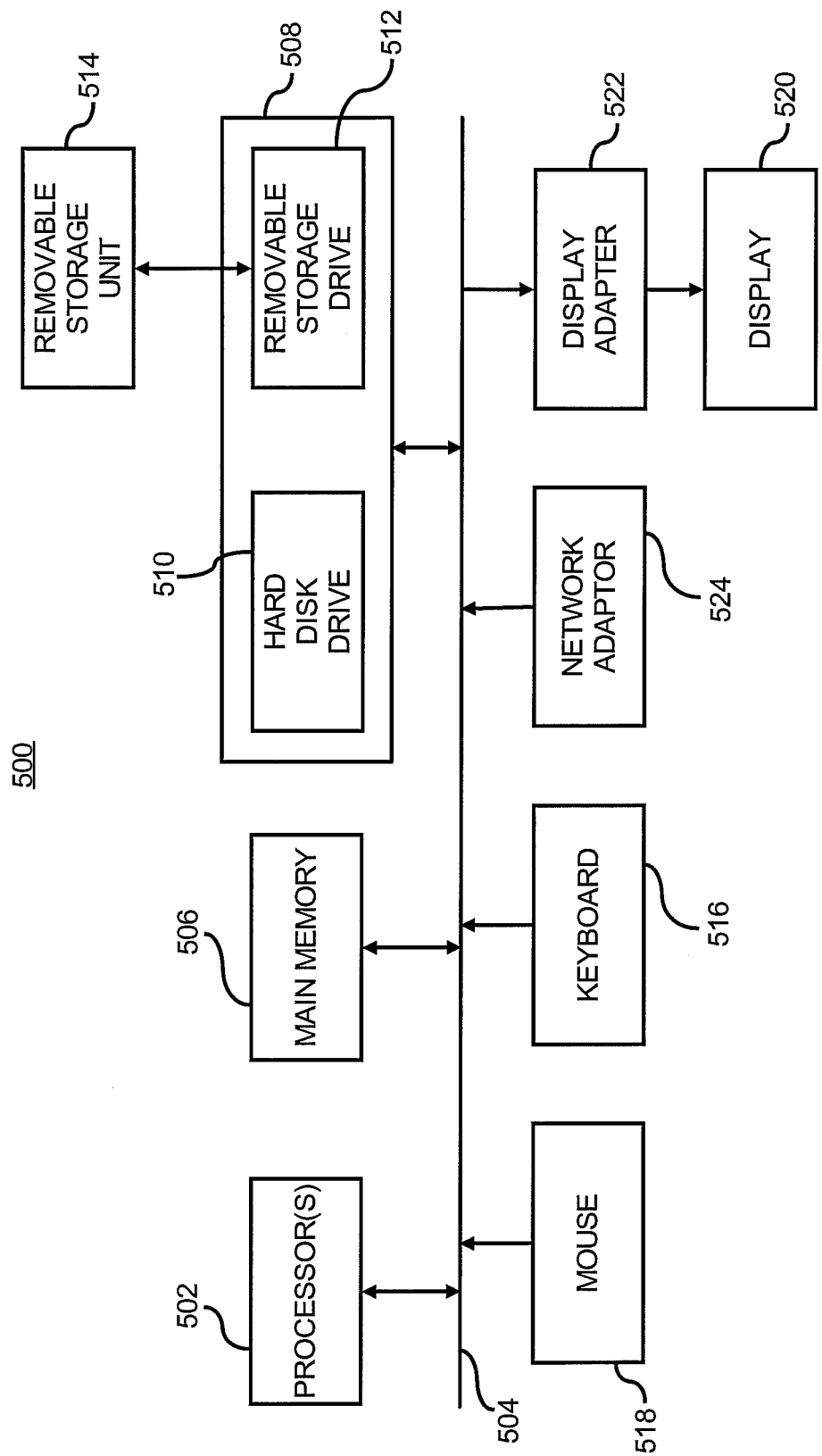
FIG. 5 shows a block diagram of a computer system 600 that may be used for enforcing DRM rules, according to an embodiment of the invention.

FIG. 5 illustrates a block diagram of a computing apparatus 500 to implement or execute one or more of the processes depicted in FIGS. 1-4B, according to an embodiment. It should be understood that the illustration of the computing apparatus 500 is a generalized illustration and that the computing apparatus 500 may include additional components and that some of the components described may be removed and/or modified without departing from a scope of the computing apparatus 500. According to an embodiment, the computing apparatus 500 comprises the first device 200 depicted in FIG. 1.

The computing apparatus 500 includes a processor 502 that may implement or execute some or all of the steps described in one or more of the processes depicted in FIGS. 3A-4B. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for one or more of the processes depicted in FIGS. 3A-4B may be stored.

The removable storage drive 512 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

Embodiments of the present invention may be applied to cap vendor liability associated with manufacture of LRMs. Embodiments of the invention enable system recovery against instances of abuse of what was intended when specifying differentiation of key purposes relevant to the original issuer of ROs that are transferred via A2A transactions. For instance, if the RO is ever lent by a DRM requester to a rogue DRM Agent, the rogue DRM Agent may "lend" the RO concurrently to an arbitrary number of devices (i.e., without waiting for release), each of which has seemingly legitimate use of the RO for a period of time specified by the rogue DRM agent. Embodiments of the invention enable effective recall of the RO with regard to further transfers, which would not otherwise be the case even if the LRM has been revoked and any known-compromised devices that have handled the RO have been revoked.

What has been described and illustrated herein are embodiments of the invention along with some of their variations.

The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for enforcing digital rights management (DRM) rules in a first device that is a primary device, said method comprising steps performed by a processor of:

receiving, at the first device, a message including a rights object (RO) having a digital signature directly from a source device;

determining an identity of a signing entity from the message including the RO having the digital signature, wherein the signing entity is an entity that digitally signed the RO;

processing the message including the RO having the digital signature using the identity of the signing entity and an information state, wherein the information state provides one of independently acquired information about the signing entity or indication of absence of independently acquired information about the signing entity, to enforce DRM rules in the first device;

ascertaining a registration status of the first device by using the information state to determine whether the first device has a currently valid context with the signing entity; and in response to the first device having a currently valid context with the signing entity, confirming the registration of the first device and enabling the RO to provide access to DRM content at the first device.

2. The method of claim 1, wherein processing the message comprises using the information state to determine whether there is evidence that the signing entity has been revoked; and in response to a determination that there is evidence that the signing entity has been revoked, rejecting the RO.

3. The method of claim 2, wherein determining whether there is evidence that the signing entity has been revoked further comprises determining whether the signing entity is at least one of part of an acquired certificate revocation list (CRL) or a revoked entity determined by an acquired online certificate status protocol (OCSP) response.

4. A method for enforcing digital rights management (DRM) rules in a first device that is a primary device, said method comprising steps performed by a processor of:

receiving, at the first device, a message including a rights object (RO) having a digital signature directly from a source device;

determining an identity of a signing entity from the message including the RO having the digital signature, wherein the signing entity is an entity that digitally signed the RO;

processing the message including the RO having the digital signature using the identity of the signing entity and an information state, wherein the information state provides one of independently acquired information about the signing entity or indication of absence of independently acquired information about the signing entity, to enforce DRM rules in the first device, wherein processing the message further includes determining whether the RO has a constraint, wherein the RO having the constraint requires a registration with the signing entity to provide access to DRM content;

in response to the RO having the constraint, tagging, at the first device, the RO with a tag as requiring confirmation of the registration; and ascertaining a registration status of the first device by using the information state to determine whether the first device has a currently valid context with the signing entity;

in response to the first device having a currently valid context with the signing entity, confirming the registration of the first device; and removing the tag, wherein the RO thereafter is operable to provide access to DRM content at the first device.

5. The method of claim 4, further comprising:

in response to the first device not having a currently valid context with the signing entity, locating the signing entity using a Universal Resource Locator (URL) wherein the RO includes the URL;

sending a registration request message to the signing entity; and receiving at the first device a registration response message, wherein the registration response message indicates one of a registration of the first device or a denial of registration of the first device.

6. The method of claim 5, further comprising, at the signing entity:

receiving the registration request message;

determining whether a total number of counted registered devices is less than a predetermined limit, wherein the total number of counted registered devices is one of a total number of concurrently registered primary devices or a total number of concurrently registered primary and secondary devices;

in response to the total number of counted registered devices being less than the predetermined limit, registering the first device and preparing the registration response message to indicate that the first device is registered;

in response to the total number of counted registered devices being equal to or greater than the predetermined limit, denying the registration request and causing the registration response message to indicate that the registration request has been denied; and sending the registration response message to the first device.

7. A method for enforcing digital rights management (DRM) rules in a first device that is a primary device, said method comprising steps performed by a processor of:

receiving, at the first device, a message including a rights object (RO) having a digital signature directly from a source device;

determining an identity of a signing entity from the message including the RO having the digital signature, wherein the signing entity is an entity that digitally signed the RO;

processing the message including the RO having the digital signature using the identity of the signing entity and an information state, wherein the information state provides one of independently acquired information about the signing entity or indication of absence of independently acquired information about the signing entity, to enforce DRM rules in the first device;

determining whether the message was received from one of a move RO transaction or a copy RO operation;

in response to the message having been received from one of a move RO transaction and a copy RO operation, determining whether the RO is operable to be moved directly from the first device to another primary device; and in response to the message not having been received in a move RO transaction or a copy RO operation, disabling the RO from moving directly from the first device to another primary device.

8. A method for enforcing digital rights management (DRM) rules in a first device that is a primary device, said method comprising steps performed by a processor of:

receiving, at the first device, a message including a rights object (RO) having a digital signature directly from a source device;

determining an identity of a signing entity from the message including the RO having the digital signature, wherein the signing entity is an entity that digitally signed the RO;

processing the message including the RO having the digital signature using the identity of the signing entity and an information state, wherein the information state provides one of independently acquired information about the signing entity or indication of absence of independently acquired information about the signing entity, to enforce DRM rules in the first device; enabling the RO to be moved through an authorized move-enabled rights issuer (RI) to another device, wherein the another device is one of a primary device or a secondary device;

determining whether the signing entity is one of a local rights manager (LRM) and an RI;

in response to the signing entity being an LRM, identifying at least one RI within a move indication element in the RO as an authorized move-enabled RI, and in response to the signing entity being an RI, identifying the RI as an authorized move-enabled RI.

9. A method of moving a rights object (RO) from a first device to another device, wherein the another device is a primary device, said method comprising:

at an rights issuer (RI), receiving a move request message from the first device, wherein the RI is a signing entity;

determining whether the first device is a primary device;

in response to the first device being a primary device,
preparing a move response message to the first device indicating success of move request,
sending the move response message to the first device,
generating a new RO based on a prior RO, wherein the new RO is enabled to be moved directly from one primary device to another primary device and is constrained so that a recipient primary device of a direct move is required to at least one of perform and have previously performed registration with the RI as a condition of the RO being operable to provide access to digital rights management (DRM) content,
signing the new RO with a new signature, and
sending the new RO having the new signature to the another device; and in response to the first device not being a primary device,
preparing a move response message to the first device indicating denial of the move request, and
sending the move response message to the first device.

10. The method of claim 9, further comprising:
in the first device, in response to the RO being enabled to allow a move of partial rights, determining whether the RO was digitally signed by an local rights manager (LRM) or an RI;
moving one of all or part of remaining rights in the RO using an authorized move-enabled RI, wherein the authorized move-enabled RI is one of,
the RI that digitally signed the RO in response to a determination that the RO was digitally signed by an RI; and
one of one or more RIs identified within the RO in response to a determination that the RO was digitally signed by an LRM.

11. A first device for enforcing digital rights management (DRM) rules using a rights object (RO) having a signature, said first device comprising:

an input output module to receive a message including an RO having a digital signature from a source device;

a signature determination module to determine an identity of a signing entity from the message including the RO having the digital signature, wherein the signing entity is an entity that digitally signed the RO; and an RO processing module to process the message including the RO having the digital signature using the identity of the signing entity and an information state, wherein the information state provides one of independently acquired information about the signing entity, or indication of absence of independently acquired information about the signing entity, to enforce DRM rules, wherein the RO processing module further comprises a constraint module that:
determines whether the RO has a constraint, wherein the RO having the constraint requires a registration with the signing entity to provide access to DRM content, and to tag the RO at the first device as requiring confirmation of the registration in response to the RO having the constraint; and in response to the RO not having the constraint, the constraint module:
determines whether the first device has a currently valid context with the signing entity using the information state, and
in response to the first device having the currently valid context with the signing entity, confirms registration of the first device, and
removes the tag, wherein the RO thereafter is operable to provide access to DRM content at the first device.

12. The first device of claim 11, wherein the RO processing module further includes a signing entity revocation module, wherein the signing entity revocation module uses the information state to determine whether the signing entity has been revoked and to reject the RO in response to a determination that the signing entity has been revoked.

13. The first device of claim 12, wherein the signing entity revocation module determines whether the signing entity has been revoked by determining whether the signing entity is at least one of part of an acquired certificate revocation list (CRL) and a revoked entity determined by an acquired online certificate status protocol (OCSP) response.

14. The first device of claim 11, wherein in response to the first device not having a currently valid context with the signing entity, the constraint module further:
locates the signing entity using a universal resource locator (URL) wherein the RO includes the URL;
sends a registration request message to the signing entity, and
receives a registration response message, wherein the registration response message indicates one of a registration of the first device or a denial of registration of the first device.

15. A non-transitory computer readable storage medium on which is embedded one or more computer programs, said one or more computer programs implementing a method for enforcing DRM rules in a first device that is a primary device, the computer programs comprising a set of instructions for:
- receiving, at the first device, a message including an rights object (RO) having a digital signature directly from a source device;
- determining an identity of a signing entity from the message including the RO having the digital signature, wherein the signing entity is an entity that digitally signed the RO; and
- processing the message including the RO having the digital signature using the identity of the signing entity and an information state, wherein the information state provides one of independently acquired information about the signing entity, and indication of absence of independently acquired information about the signing entity, to enforce DRM rules in the first device;
- ascertaining a registration status of the first device by using the information state to determine whether the first device has a currently valid context with the signing entity; and
- in response to the first device having a currently valid context with the signing entity, confirming the registration of the first device and enabling the RO to provide access to DRM content at the first device.

16. The computer readable storage medium of claim 15, wherein processing the message further comprises:
- determining whether the RO has a constraint, wherein the RO having the constraint requires the registration with the signing entity to provide access to DRM content; and
- in response to the RO having the constraint, tagging the RO at the first device as requiring confirmation of the registration.

17. The computer readable storage medium of claim 15, wherein processing the message further comprises:
- using the information state to determine whether there is evidence that the signing entity has been revoked; and
- in response to a determination that there is evidence that the signing entity has been revoked, rejecting the RO.

* * * * *